United States Patent [19]

Herz

[11] Patent Number: 5,262,865
[45] Date of Patent: Nov. 16, 1993

[54] VIRTUAL CONTROL APPARATUS FOR AUTOMATING VIDEO EDITING STATIONS

[75] Inventor: William Herz, Newark, Calif.

[73] Assignee: Sony Electronics Inc., Park Ridge, N.J.

[21] Appl. No.: 925,321

[22] Filed: Aug. 4, 1992

Related U.S. Application Data

[63] Continuation of Ser. No. 715,332, Jun. 14, 1991, abandoned.

[51] Int. Cl.⁵ ............................................. H04N 5/222
[52] U.S. Cl. ...................................... 358/181; 358/185
[58] Field of Search ................ 358/181, 311, 903, 185

[56] References Cited

U.S. PATENT DOCUMENTS 4,698,664  10/1987  Nichols ............................... 358/185
4,745,478  5/1988  Nakagawa ............................ 358/181

OTHER PUBLICATIONS

Sony Edit Gear XV-Z10000, Apr. 1989.

*Primary Examiner*—James J. Groody
*Assistant Examiner*—David E. Harvey
*Attorney, Agent, or Firm*—Blakely Sokoloff Taylor & Zafman

[57] ABSTRACT

A virtual control apparatus for emulating a video mixer through a computer, wherein the computer can receive data and command information from its own command input devices. The data and command information are mapped into data in format recognizable by the CPU within the computer. The resulting data and command are stored in the memory of the computer and/or transferred to the video mixer for immediate video manipulation. Data transfer between the video mixer and the computer is implemented through a communication tool, which establishes the protocol of communication between the computer and the video mixer. Edit decisions from the video mixer can be transferred to and saved in the computer memory for subsequent use. Also disclosed is a video communication tool between a video mixer and a computer. When serial data and control signals are transferred from the video mixer to the computer, serial data are converted into parallel data through a state machine and control logic unit, upon the beginning of a new frame. The parallel data are transferred to a FIFO. Upon the end of frame the FIFO is ported to the computer. When parallel data and control signals are transferred from the computer to the video mixer, parallel data are stored in a FIFO. Upon an appropriate control signal from the state machine, parallel data are converted into serial data. The serial data are clocked to the video mixer on the rising edge of the clock.

13 Claims, 8 Drawing Sheets

| Byte | bit 7 | bit 6 | bit 5 | bit 4 | bit 3 | bit 2 | bit 1 | bit 0 |
|---|---|---|---|---|---|---|---|---|
| 1 | - | EXT-LOCK | - | - | effect 1 normal | MULTI | PinP | TITLE INDEX |
| 2 | EFFECT 2 NORMAL | STILL | STOROBO | BYPASS | EFFECT 3 NORMAL | BIT DEFECT | NEGATIVE | SIMULATED COLOR |
| 3 | ZOOM UP | ZOOM DOWN | Mosaic UP | Mosaic Down | MONOTONE | COLORING | SOLARIZATION | COLOR CORRECT |
| 4 | MEMORY ACTION | REPLAY | FRAME | RANDOM | POWER | POSITION ON/OFF | ZOOM | ZOOM |
| 5 | LAIN A 1 | ←2 | ←3 | ←4 | (←5) | (←6) | ← BACK COLOR | - |
| 6 | LAIN B 1 | ←2 | ←3 | ←4 | (←5) | (←6) | ← BACK COLOR | - |
| 7 | EFFECT ON/OFF A | EFFECT ON/OFF B | -- | -- | AUTO START | MONITOR PROCESS | ←A | ←B |
| 8 | MONITOR SUPER-VISI | ← EXT-KEY | DIRECTION ONE-WAY | ← REVERSE | EDIT AUDIO PROCESS | ← LINE | ←A | ←B |
| 9 | AUDIO PROCESS | ← LINE | ←A | ←B | CHROMA-KEY | WIPE | MIX | STANDBY |
| 10 | ZoomWipe I | Zoom Wipe II | SCROLL I | SCROLL II | EXT-KEY | Back ColorR | ← G | ← B |
| 11 | ▨ | ▨ | ▨ | ▨ | ▨ | ▨ | ▨ | ▨ |
| 12 | ▨ | ▨ | ▨ | ▨ | ▨ | ▨ | ▨ | ▨ |
| 13 | EDGE HARD | ← BORDER | ← SOFT | CUT-IN | CHROMA-KEY | MULTI | PinP | STILL |
| 14 | ZOOM UP | ZOOM DOWN | Mosaic Up | Mosaic Down | | | | FLASH |
| 15 | MEMORY ACTION | REPLAY | | RANDOM | ZOOM WIPE I | ZOOM WIPE II | SCROLL I | SCROLL II |
| 16 | - | -- | -- | DATA FIELD | -- | -- | MSB ←——→ | |
| 17 | MSB ←——————— LEVER ———————→ LSB ||||||||
| 18 | MSB ←——————— STROBO SPEED ———————→ LSB ||||||||
| 19 | MSB ←——————— ZOOM POSITION X ———————→ LSB ||||||||
| 20 | MSB ←——————— ZOOM POSITION Y ———————→ LSB ||||||||
| 21 | MSB ←——————— AUTO SPEED ———————→ LSB ||||||||
| 22 | MSB ←——————— COLOR SELECT R-Y ———————→ LSB ||||||||
| 23 | MSB ←——————— COLOR SELECT B-Y ———————→ LSB ||||||||
| 24 | MSB ←——————— LUMINANCE LEVEL ———————→ LSB ||||||||
| 25 | MSB ←——————— LUMINANCE RANGE ———————→ LSB ||||||||
| 26 | MSB ←——————— CHROMINANCE HUE A ———————→ LSB ||||||||
| 27 | MSB ←——————— CHROMINANCE HUE B ———————→ LSB ||||||||
| 28 | MSB ←——————— CHROMINANCE LEVEL ———————→ LSB ||||||||
| 29 | MSB ←——————— INSERT GAIN ———————→ LSB ||||||||
| 30 | MSB ←——————— EXT KEY LEVEL ———————→ LSB ||||||||

Figure 6

VIRTUAL CONTROL APPARATUS FOR AUTOMATING VIDEO EDITING STATIONS

This is a continuation of application Ser. No. 07/715,332 filed on Jun. 14, 1991, now abandoned.

BACKGROUND OF THE INVENTION

1. Field of the Invention

The present invention relates to the field of video mixers, also known as video switcher or video edit gear, and particularly to the field of automated video communication and control between a video mixer and a computer.

2. Art Background

With the advent of video technology in image recording, it has become more and more common to use a video mixer for editing video tapes. Video tapes offer many attractive features. In video recording there are no foot cuts and no rolls of film to unravel and no footage is lost. A first cut in video, or any other screening, can be easily saved and reshown at any time. Complicated video effects can also be accomplished off-line that would look as real and immediate as they were done on-line. Finally, aside from any delay due to editorial decisions, videotape editing is undoubtedly much faster than film editing.

Figure 1A:
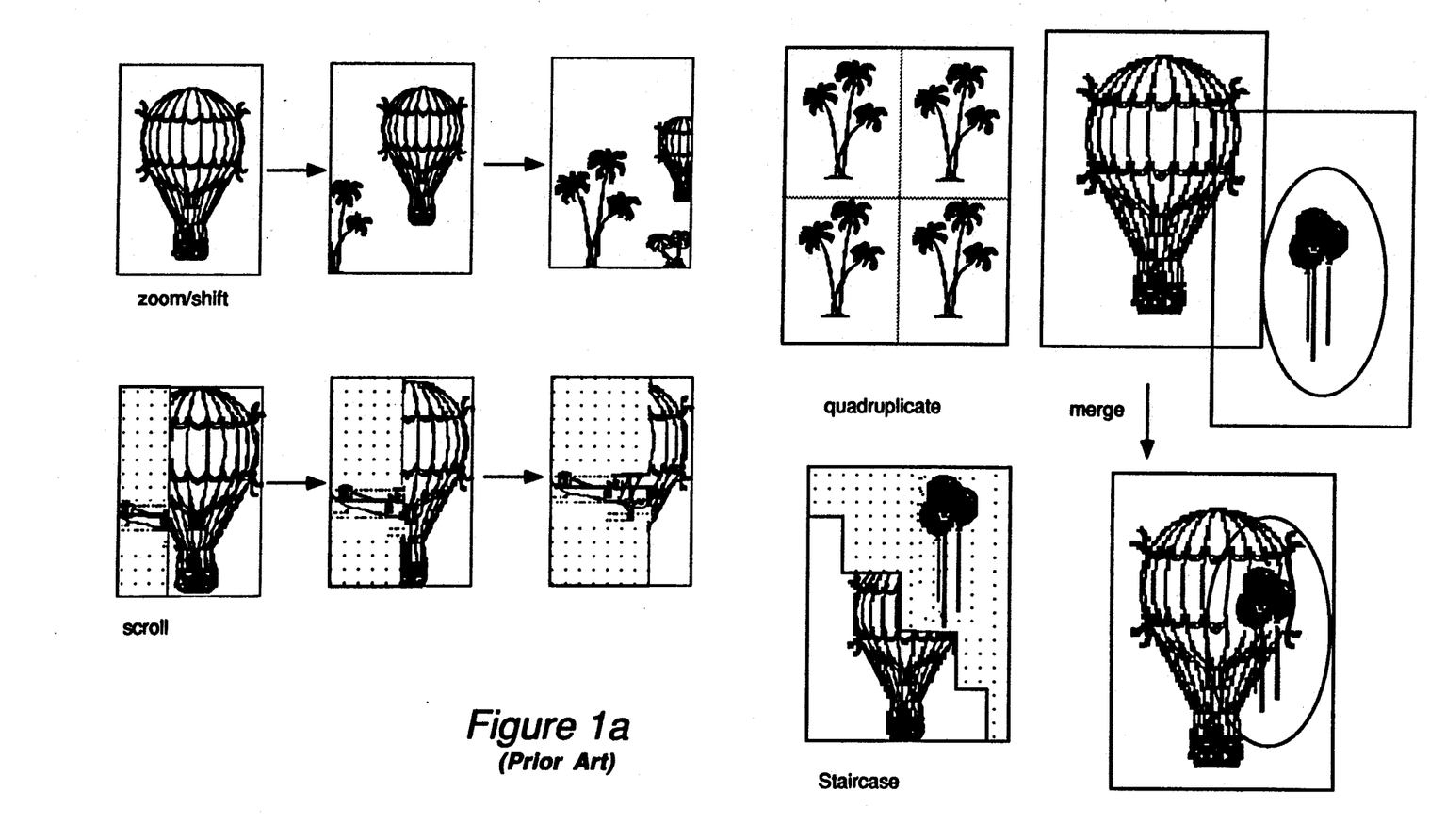
FIG. 1a is a pictorial representation of some of the functions of a video mixer.

An illustrative example of such a videotape editing system can be found in the Edit Gear, XV-Z10000, manufactured by the Sony Corporation of Tokyo, Japan. With a touch of buttons on the control panel, or "switcher head," video signals can be combined, mixed, switched, overlapped, inserted, duplicated, miniaturized, interwoven, compressed, zoomed, scrolled, and etc., to create a variety of special effects. FIG. 1a illustrates some of the functions of the XV-Z10000.

Figure 1B:
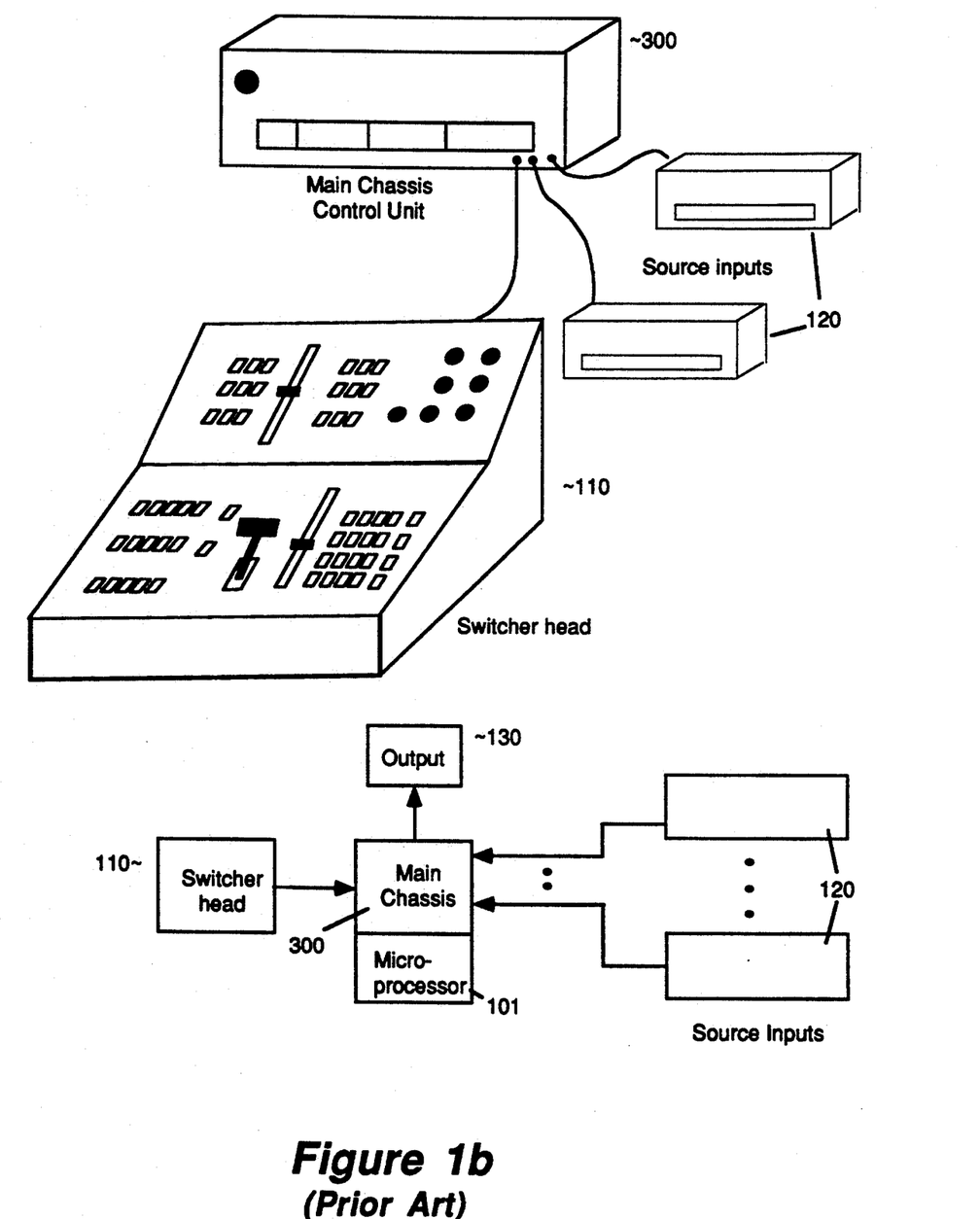
FIG. 1b is a block diagram illustrating the edit gear's, XV-Z10000, environment.

As demonstrated in FIG. 1b, the XV-Z10000 consists of two physical units: a main chassis 300 and a switcher head 110. The main chassis 300 is the control unit, where input 120 and output 130 video signals are connected to be processed. The main chassis 300 utilizes a 4-bit microcomputer 101 for processing. The switcher head 110 is the "button panel" which selects the desired effects such as wipe pattern, luminance, chrominance, and zoom effect.

Figure 2:
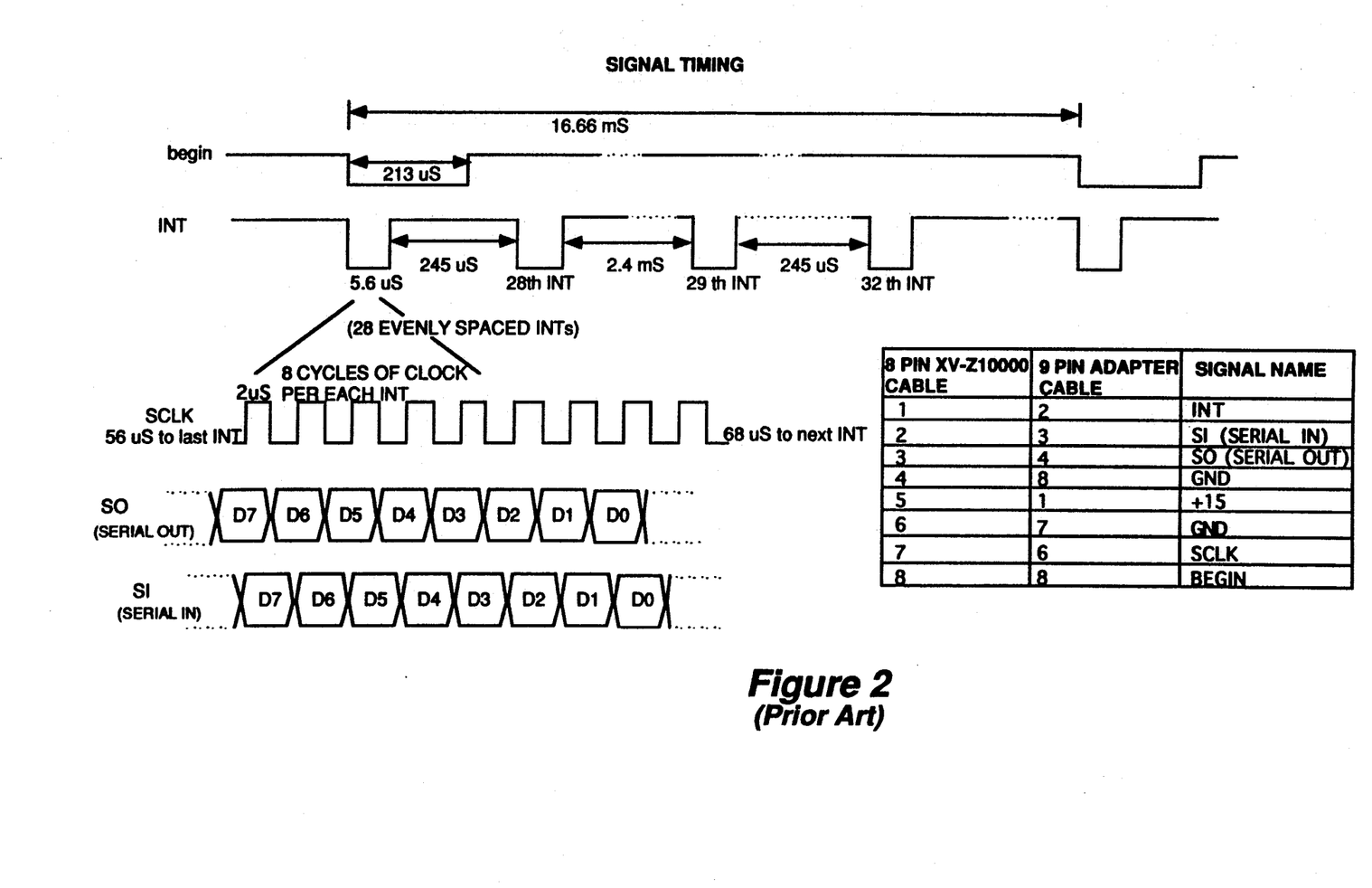
FIG. 2 illustrates the "3-point serial" communication protocol for the XV-Z10000.

Reference is now made to FIG. 2, where the timing scheme for the XV-Z10000 communication protocol is shown. The communication protocol between the main chassis 300 and the switcher head 110 is known as the "3-point serial," comprising a BEGIN signal which indicates a frame, an INTERVAL (INT) signal which indicates a byte, and a clock (SCLK) which represents a bit. As is shown in FIG. 2, there are currently 8 (bits) cycles of SCLK for each INT (byte) and 32 INT's for each BEGIN (frame).

It can be appreciated that operating the XV-Z10000 edit gear still requires manual operation of key buttons, which imposes a limitation as to how many buttons, or functions, a human operator's hands can manipulate in each frame. It can also be appreciated that the human operator is required to be at the "box" to operate because the XV-Z10000 is a stand-alone unit without any remote accessibility. Further, it can be appreciated that where an edit decision in one frame is identical to a previous frame, a human operator still has to re-key in the buttons. Worse yet, to perform an identical sequence of editing, as may occur if the editing is to be performed in a different location or at a different time, a human operator has to re-do the entire sequence with the utmost tedium. Finally, it can be appreciated that a human video editor still has to be physically at the "box" to make editing decisions, although it would be more efficient to be able to make edit decisions at a remote site. In a typical editing studio with multiple rooms and multiple edit gears, an editor will go from room to room to perform edits, although a centralized control environment would be more efficient.

SUMMARY OF THE INVENTION

Therefore, it is an object of the present invention to provide the capability to automate a video mixer with a computer.

It is also an object of the present invention to provide full access to all the functions of the video mixer in one frame.

It is further an object of the present invention to provide the capability to store edit sequences and edit decisions to be used at a later time, or at a different video mixer.

It is another object of the present invention to provide remote access to a plurality of video mixers in a centralized control environment.

The present invention provides a virtual control apparatus for emulating a video mixer through a computer. The computer can receive data and command information from its own command input means, such as a keyboard, a touch-sensitive screen or a screen controllable by a cursor control device. The data and command information are mapped into data in format recognizable by the central processing unit within the computer. The resulting data and command are either stored in the memory of the computer or transferred to the video mixer for immediate use. Data transfer between the video mixer and the computer is implemented through a communication tool, which establishes the protocol of communication between the computer and the video mixer. Edit decisions from the video mixer can be transferred to and saved in the computer memory for subsequent use.

The present invention also provides an automated video communication tool between the video mixer and the computer for emulating the edit control panel of the video mixer. In the first mode of transferring data from the video mixer to the computer, serial data are first converted into parallel data by a state machine and control logic unit, which detects the beginning of a new frame. The parallel data are transferred to a FIFO 1 byte at a time. When the end of frame is detected by the state machine and control unit, all data in the FIFO are outputted to the computer through an output means.

In the second mode of transferring data from the computer to the video mixer, parallel input data are entered and stored in a FIFO 1 byte at a time. Upon an appropriate control signal from the state machine and control logic unit, parallel data are converted into serial data by a parallel/serial converter. The serial data are clocked to the output means of the interface, which ports the serial data to the video mixer on the rising edge of the clock, while the video mixer's output data are clocked to the output means of the video mixer on the trailing edge of the clock.

As will be appreciated, the present invention permits edit gear like the XV-Z10000 to be automated through a computer, such as a personal computer, which emulates the microcomputer in the edit gear as well as supplements it with a much greater range of capabilities. As will be apparent from the following description, the virtual control apparatus and the automated video communication tool of the present invention permit an editor to access all the functions of the video mixer in one frame. Also, the present invention permits a sequence of edit functions to be stored and downloaded at a later time or to a different video mixer. Furthermore, the present invention may be configured in a multiple-video mixer system in a centralized environment whereby the editor can access a multiplicity of video mixers without physically moving to the video mixer to manually operate the switcher head.

BRIEF DESCRIPTION OF THE DRAWINGS

The object, features and advantages of the present invention will be apparent from the following detailed description in which.

DETAILED DESCRIPTION OF THE INVENTION

In the following description, numerous specific details are set forth, such as specific components, etc., in order to provide a thorough understanding of the present invention. However, it will be obvious to one skilled in the art that the present invention may be practiced without the specific details. In other instances, well-known circuits have not been described in detail in order not to unnecessarily obscure the present invention. Particularly, although the following description is based on a video mixer like Sony's XV-Z10000, it will be appreciated by those skilled in the art that other video mixer are also available for the intended purposes once the communication protocol between the interface and the mixer is specified. For the sake of simplicity, a communication protocol known as "3-point serial" is described in conjunction with the present invention. However, it will be apparent to those skilled in the art that other protocols may be customized to be compatible with the desired edit systems and the computers.

Figure 3A:
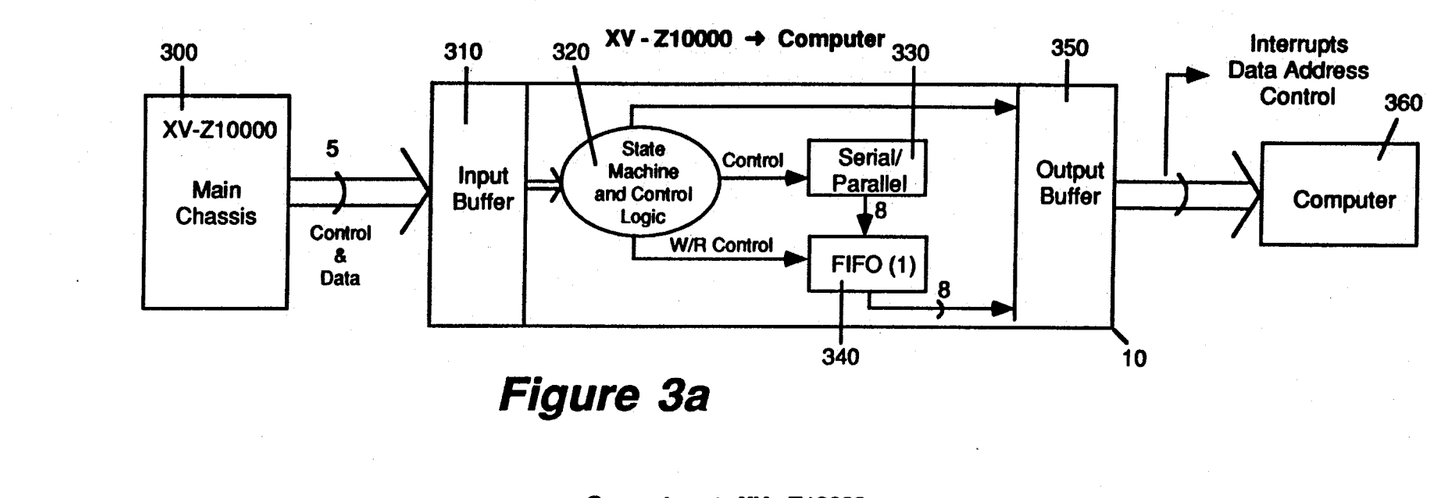
FIG. 3a is a block diagram illustrating the automated video communication tool for XV-Z10000-to-computer transfer.

Reference is now made to FIG. 3(a), where a schematic block diagram of the presently claimed automated video communication tool ("communication tool") for a XV-Z1000-to-computer transfer is shown. This computer can be personal computers of various sizes and capabilities. Control and data signals from the main chassis of the XV-Z10000 300 enter the communication tool 10 through an input buffer 310. After the control signals BEGIN and INT, are detected by the state machine and control logic unit 320, the data signals are converted into parallel data at a serial/parallel converter 330. The parallel data are transferred into a "first-in, first-out" memory (FIFO) 340 upon the detection of another INT control signal by the state machine and control logic unit 320. The FIFO 340 holds the data until all the data from within a complete frame are in the FIFO 340, i.e. when the end of a FRAME is detected. Data are transferred from FIFO 340 to buffer 350. An interrupt to the computer 360 is currently externally generated by the communication tool 10 through the state machine and control logic unit 320 for the computer to service at the next round of communication. When the communication to the computer 360 is open, data signals in the output buffer 350 are transferred to the computer 360.

Figure 4:
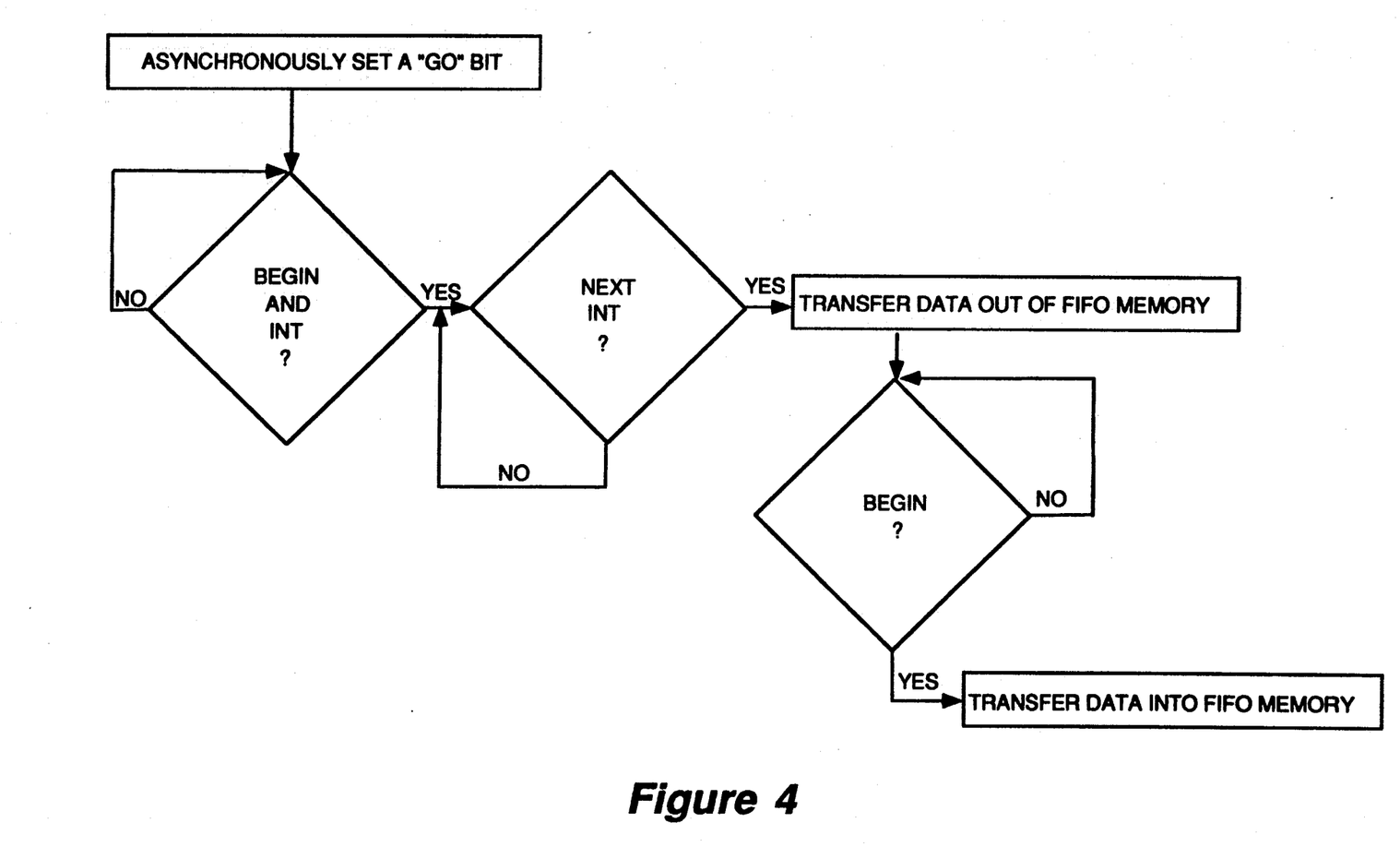
FIG. 4 illustrates a state diagram for the state machine and control logic unit within the automated video communication tool.

Reference is now made to FIG. 4, where a state diagram for the state machine and control logic unit is shown. Asynchronously setting the "GO" bit in the address allows the computer 360 to gain control of the XV-Z10000 unit 300. As can be seen from the state diagram, the communication tool of the present invention is initialized by detecting a BEGIN and a first INT in the incoming signals. Data are transferred out of the write memory for each INT detected (each INT represents a complete Byte). When another BEGIN is detected, the data are transferred into a read memory for the target recipient to read.

Figure 3B:
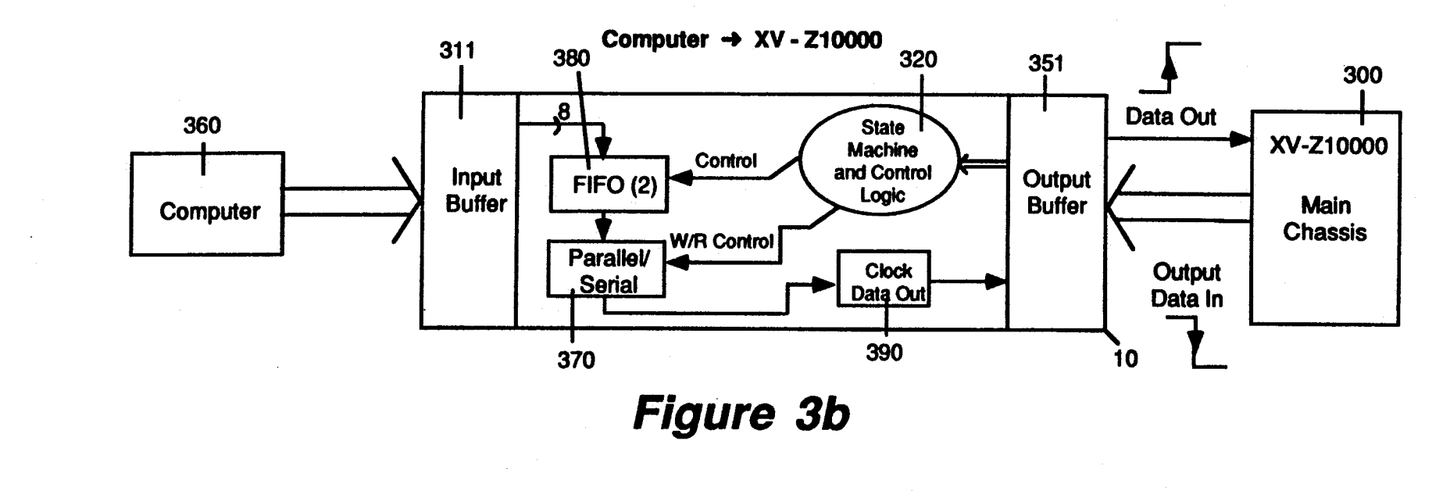
FIG. 3b is a block diagram illustrating the automated video communication tool for computer-to-XV-Z10000 transfer.

Referring back to FIG. 3(b), a schematic block diagram for the presently claimed communication tool for a computer-to-XV-Z10000 transfer is shown. Parallel data are first transferred to the input buffer 311 from the computer 360. When the control signals are sent by the state machine 320, data are transferred into the FIFO 380. Data in the FIFO 380 are converted into serial format by the parallel/serial converter 370 upon a control signal from the state machine and control logic unit and clocked to the output buffer 351 by the clock unit 390. Serial data are transferred to the XV-Z10000's main chassis on the rising edge of the clock, while output data are transferred to the computer 360 on the falling edge of the clock.

Figure 5:
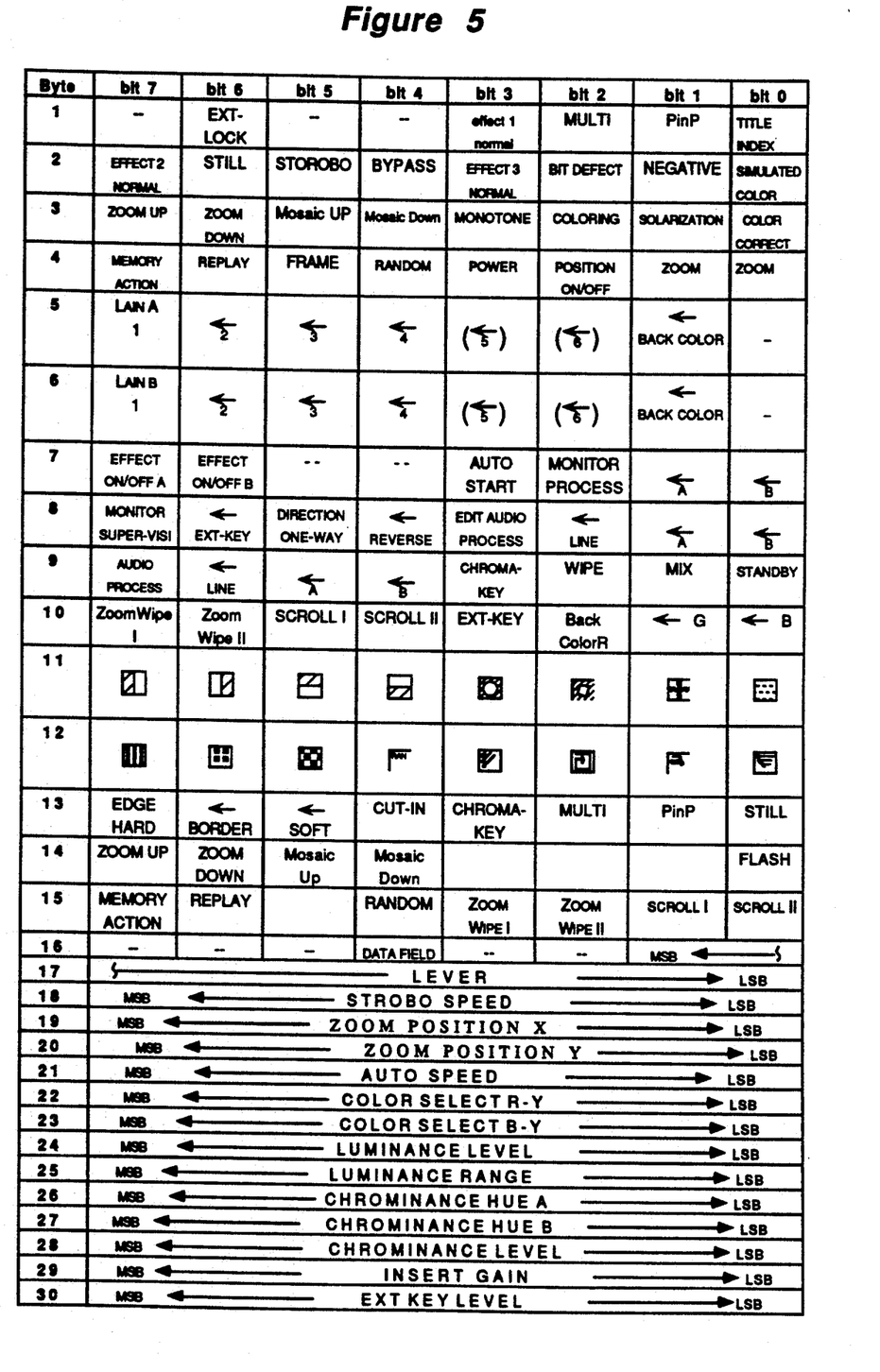
FIG. 5 illustrates a "virtual control panel" created by using the automated video communication tool.

FIG. 5 illustrates the data format created by formatting means of the system using the video communication tool. As can be appreciated, all bits of the virtual control panel can be set in one frame, which consists of 32 8-bit INT's (Bytes). The user of the system selects via the computer the editing functions to be executed by the video mixer. The formatting means, such as the CPU, formats the functions selected into the data format for transmission via the video communication tool for execution by the mixer in a single frame. As an illustrative example of the automated video communication tool, assume that the following edit functions are to be performed on the switcher head by an operator for one frame:

Zoom up-Mosaic down-Zoom wipe-Scroll I-Mix.

As these functions are executed on the immediate video sources, the functions are also converted into parallel data format one byte at a time and transferred to an external computer in binary format according to the virtual control panel of FIG. 5: (Assuming a "1" indicates that the key is activated on the 8-by-32 data array.)

| | |
|---|---|
| Byte 3: | 1001 0000 (Zoom and Mosaic down) |
| Byte 9: | 0000 0010 (Mix) |
| Byte 15: | 0000 1010 (Wipe and Scroll I) |
| Byte 22: | 0000 0010 (Mix) |
| All other bytes of the 32 byte array are inactive ("0"). | |

It can be readily appreciated that the data transferred to the computer can be stored and retrieved for later use for a different frame or a different video mixer. As long as the "3-point serial" protocol is established among the communication tool, the virtual control panel, and the target video mixer, data can be readily downloaded to a different mixer from the computer through the communication tool. It will be understood that those skilled in the art can readily provide necessary softwares interacting between the computer and the communication tool to create the virtual control panel. All functions on this virtual control panel can be executed in one frame, which is less than one second using the current timing scheme, if all bits in the 32 bytes are set to 1. Without the automated communication tool and the virtual control panel of the present invention, the switcher head must execute functions in a sequential method during the interval of several frames. With the aid of the computer, precise editing of frames can be achieved by programming the computer to edit a picture on a frame-by frame or multiple-frame basis. The computer also helps in developing edit decision lists to conform to a previously drafted edit decision list precisely, thus achieving effects beyond the capabilities of the previous manual switcher head control. In addition, edit decisions can be made first on a computer and then downloaded to the main chassis of a video mixer, thus achieving higher productivity for any given mixer.

Figure 6:
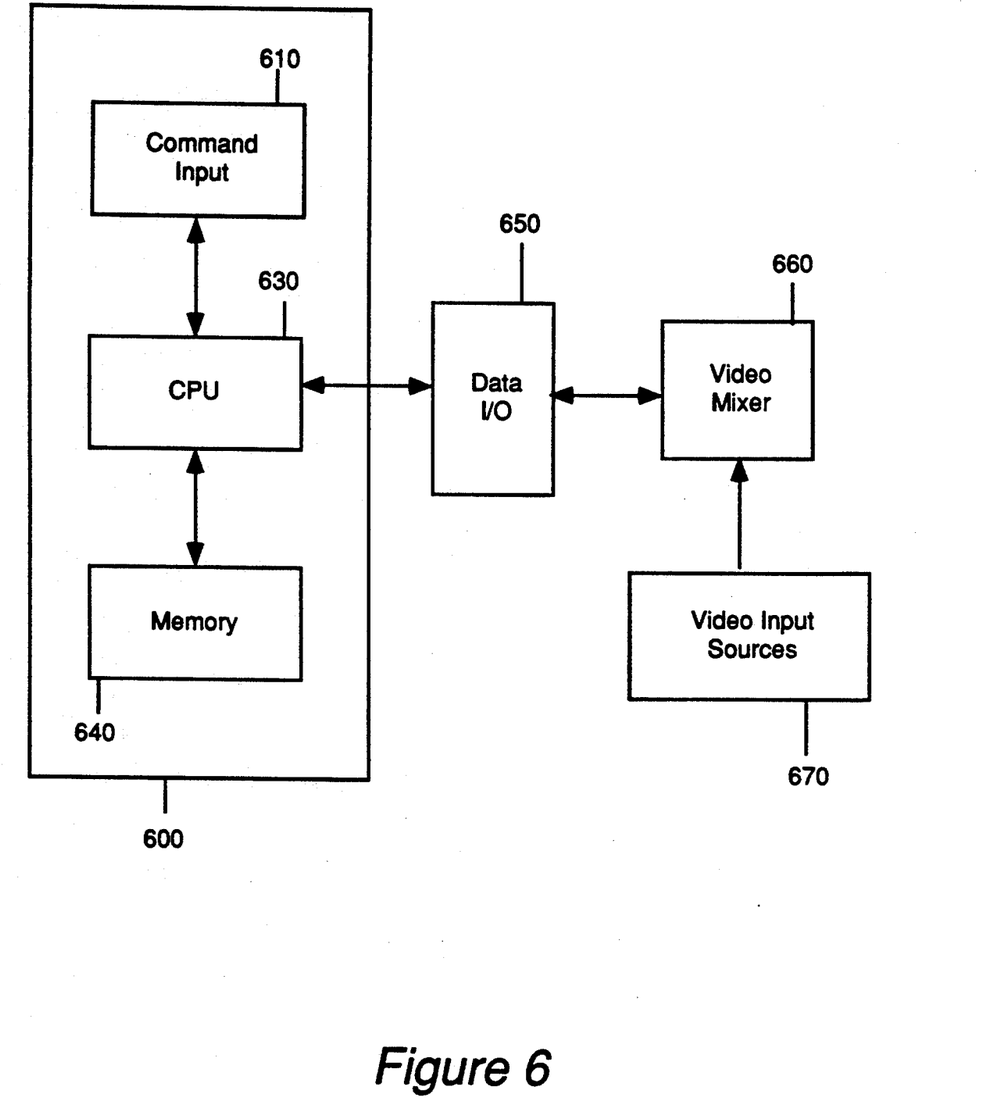
FIG. 6 illustrates a virtual control apparatus embodying the presently claimed invention for automating video editing communication.

Reference is now made to FIG. 6, where a schematic block diagram of a virtual control apparatus employing the presently claimed invention is shown. In one aspect of the operation, edit command inputs are entered through a command input means 610, which can be either a computer keyboard, a touch-sensitive screen, or a screen display with a cursor control device such as a "mouse". The CPU 630, as a formatting means, formats the data according to the dictates of a software program, which can be readily designed and implemented by those skilled in the art. After the data is formatted by the CPU 630, the resulting data can either be stored in a memory 640 for later use, or outputted to a data input-/output (I/O) means 650 for use by a video mixer 660. The data I/O means 650 transfers the CPU-produced data from the CPU 630 to a video mixer 660, which manipulates the video input sources 670 to create the desired effects.

In another aspect of operation, the video mixer 660 operates to manipulate the video input sources 670. The same data and control signals are transferred to the CPU 630 through the data I/O means 650, which converts the data and control signals into proper format for the CPU 630. As described in the foregoing description, the data I/O means 650 may comprise an automated video communication tool such that serial data and control signals are converted into parallel signals for the CPU 630. The CPU 630 can, in turn, store the data and control signals in its memory 640 for subsequent downloading. As indicated in a schematic block in FIG. 6, the command input means 610, the CPU 630, and memory 640 can be contained in a computer unit 600 and the data I/O means 650 can be the interface board between the computer 600 and the video mixer 660.

Figure 1C:
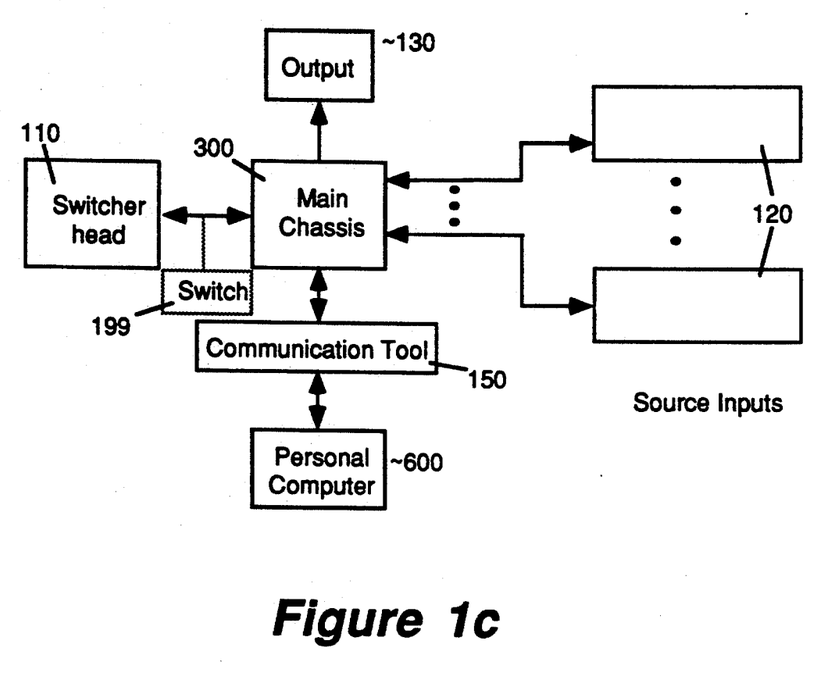
FIG. 1c is a block diagram illustrating the XV-Z10000's environment when incorporating the presently claimed invention.

Another conceptual representation can be found at FIG. 1c, where XV-Z10000's control environment embodying the virtual control apparatus of the present invention is shown. A communication tool 150 interfaces between a computer 600 and the main chassis 300 of the XV-Z10000. The switcher head 110 of the XV-Z10000 can control the main chassis 300 to manipulate the video inputs 120. The main chassis 300 can also be solely connected to the computer 600 such that the computer can control the main chassis 300 to manipulate the video inputs 120 as a remote control. As can be observed in FIG. 1c, the computer 600 can enhance the capability of the main chassis 300 by replacing the microcomputer 101 of the original arrangement as in FIG. 1b, as well as the manually-operated switcher head 110.

Furthermore, with reference to FIG. 1c, a switchable connector 199 can be implemented between the switcher head 110 and the main chassis 300. This switchable connector can be a plurality of single throw double pole switches, which can be controlled by the computer 600 or manually operated, such that one position will allow the commands from the computer 600 to be reflected on the buttons of the switcher head 110 (visual feedback) and another position of the switchable connector 199 will disable the switcher head 110 such that the computer 600 communicates with the main chassis 300 directly with the computer 600 providing visual feedback of the command inputs. A cable incorporating the switchable connector 199 has the pinouts illustrated in FIG. 2, where SI and SO represent "serial-in" and "serial-out," respectively. Additional switches in the switchable connector can be utilized to direct the data flow between devices to external leads which may be easily connected to diagnostic equipment.

Thus, for example, a first switch of the switchable connector 119 can enable the serial line to switcher head 110 to receive input from the computer 600 and main chassis 300 such that the switcher head 110 can provide visible feedback in response to operations performed by the computer 600 at the main chassis 300. Alternatively, the reverse effect can be achieved by disabling the serial-out line to the switcher head 110 and enabling the serial-in line to permit user input through the switcher head 110 and visual feedback at the computer 600. The switchable connector may also be used to permit the user to switch between input devices when desirable to achieve different results. For example, a first user may remotely execute a stored sequence of editing commands through the computer 600 followed by a second user executing a series of manual edit commands which the user desires to execute through the switcher head 110. Alternately a remote user at the computer 600 and a local user at the switcher head 110 may jointly perform edits by switching between the switcher head 110 and computer 600.

The present invention further provides a data protection mechanism to avoid the loss of data or transmission of incorrect data due to switching between the switcher head 110 and the computer 600. At the end of each frame, an interrupt is generated by the communication tool 150 to the computer 600. The computer responds to the interrupt by reading the status on the state machine in the communication tool 150 and outputting data to the communication tool (such as editing commands to be performed). Thus when control of input is changed from the computer to the switcher head, the computer will complete its output of frame data and wait until control of input is changed back to the computer. Because the interrupt is not generated and hence not acted upon until the end of a frame, no data transmission loss occurs when the switch gives control of data flow from the computer 600 to the switcher head 110. When control of input is changed back to the computer, and an interrupt is generated at the end of a frame, the computer, upon receipt of the interrupt will read the status and initiate transmission of input data. Currently, the computer 600 echoes back the edit commands as a default mode until modified by the user. Thus in the present invention, overlap of input data by the switcher head and computer and data loss are avoided.

What is claimed is:

1. A virtual control apparatus for controlling at least one video mixer, said video mixer performing edit operations on a plurality of video input sources coupled to said video mixer, said edit operations performed in accordance with an edit command received, said video mixer issuing video mixer control signals indicative of timing of signals of video input sources coupled to the video mixer, said virtual control apparatus comprising:

computer means including memory, mass storage, and command input devices for entering edit commands representing said edit operations to be performed on said video input sources by said video mixer, said memory comprising a data array comprising a plurality of data words, for storage of a plurality of edit commands representative of edit operations entered via the input devices, said computer means formatting and storing said edit commands in the data array;

communication means for transferring said edit commands between said computer means and said video mixer, said communication means comprising;

a first input means for receiving video mixer control signals and the data array when input commands are to be executed on the video mixer, a FIFO buffer for storing the plurality of data words of the data array received, control signals from said video mixer, conversion means for converting the contents of the data array located in the FIFO buffer to serial data for output, and control logic means coupled to the input means and conversion means for controlling the conversion and output of the data array as serial output data signals to said video mixer upon receipt of video mixer control signals;

such that said serial output data signals comprising a plurality of edit commands are received within a single transmission to cause said video mixer to invoke said edit operations during a single frame.

2. The virtual control apparatus as defined by claim 1, wherein said video mixer control signals comprise BEGIN signals, INTERVAL signals, and CLOCK signals, such that each of said BEGIN signals triggers a frame in said video mixer, and said CLOCK signals synchronize each bit of said data array output as serial output data.

3. The virtual control apparatus defined by claim 2, wherein said control logic means controls the conversion means to convert a data word into serial output data if one of said INTERVAL signals received after one of said INTERVAL signals is synchronously received with one of said BEGIN signals.

4. The virtual control apparatus defined by claim 3, wherein said communication means transmits said serial output data signals to said video mixer synchronous with the rising edge of said CLOCK signals.

5. The virtual control apparatus defined by claim 1, wherein said communication means further receives serial input data signals from said video mixer, converts said serial input data signals into said data array, and transfers said data array to said computer means as feedback to the edit operations performed.

6. The virtual control apparatus defined by claim 5 wherein said communication means further comprises:

a second input means coupled to receive said serial input data signals from said video mixer;

control logic means coupled to receive said video mixer control signals, said control logic means generating a first signal upon receipt of a first video mixer control signal indicative that a word of serial data signals has been received and a second video mixer control signal indicative that a number of data words corresponding to the number of data words of the data array has been received;

serial/parallel converter means coupled to receive said serial input data signals from said input means, said serial/parallel converter means converting said serial input data signals received into a data word if a first signal is received from said control logic means;

a second FIFO buffer for receiving said data word from said serial/parallel converter means, and storing said data word in a "first-in, first-out" sequence;

output means for transferring said data array from said second FIFO buffer to said computer means if a second video mixer control signal is received.

7. The virtual control apparatus defined by claim 6 wherein said serial control signals comprise BEGIN signals, INTERVAL signals, and CLOCK signals, such that each of said BEGIN signals triggers a frame in said video mixer, and said CLOCK signals synchronize each bit of said data array.

8. The virtual control apparatus defined by claim 7 wherein said control logic means generates one of said first signals if one of said INTERVAL signals is received after one of said INTERVAL signals is synchronously received with one of said BEGIN signals, and generates one of said second signals if one of said BEGIN signals is received after one of said INTERVAL signals is synchronously received with one of said BEGIN signals.

9. The virtual control apparatus defined by claim 8 wherein said input means receives said serial input data signals from said video mixer synchronous with the falling edge of said CLOCK signals.

10. A method for performing edit operations on a video mixer, said video mixer performing edit operations on a plurality of video input sources coupled to said video mixer pursuant to edit commands received, said video mixer issuing video mixer control signals indicative of timing of signals of video input sources coupled to the video mixer, said method comprising the steps of:

entering through a computing means edit commands to be performed; storing entered edit commands in an output data array until the commands are to be executed;

when the entered edit commands are to be performed, transmitting the output data array to a communication means coupled to the video mixer and computing means;

receiving said data array from said computing means, said output data array comprising a plurality of output data words;

receiving video mixer control signals from said video mixer, said control signals comprising BEGIN signals, INTERVAL signals, and CLOCK signals, such that each of said BEGIN signals triggers a frame in said video mixer, and said CLOCK signals synchronize each bit of said output data array;

converting each output data word of the output data array received from said computing means into serial output data signals, such that one of said output data words is converted if one of said INTERVAL signals is received after one of said INTERVAL signals is synchronously received with one of said BEGIN signals;

transmitting said serial output data signals to said video mixer, such that said serial output data signals are synchronous with the rising edge of said CLOCK signals;

receiving in the communication means serial input data signals from said video mixer, such that said serial input data signals are synchronous with the falling edge of said CLOCK signals;

converting said input data signals into input data words, such that one of said input data words is generated when one of said INTERVAL signals is received after one of said INTERVAL signals is synchronously received with one of said BEGIN signals;

storing said input data words in an input data array; and transferring said input data array from said communication means to said computing means when one of said BEGIN signals is received after one of said INTERVAL signals is synchronously received with one of said BEGIN signals;

such that said serial output data signals comprising edit commands are received within a single transmission to cause said video mixer to invoke said edit operations during a single frame and said serial output data signals and serial input data signals can be communicated between the video mixer and the computing means in a bidirectional manner.

11. The method as set forth in claim 10, wherein said step of transmitting the output data array to a communication means comprises transmitting the output data array in parallel, and said step of transferring said input data array from said communication means to said computer transfers the input data array in parallel.

12. The method as set forth in claim 11, said serial input data signals comprising edit commands performed by the video mixer, said method further comprising the steps of:

said computing means receiving said input data array; and providing feedback as to the edit commands performed.

13. The method as set forth in claim 11, said serial input data signals comprising edit commands performed by the video mixer, said method further comprising the steps of:

said computing means receiving said input data array; and storing said input data array received; and transmitting said stored input data array through the communication means to a second video mixer;

said second video mixer performing the edit operations corresponding to the edit commands located in the stored input data array.

* * * * *